Patented June 9, 1953

2,641,560

UNITED STATES PATENT OFFICE 2,641,560

MEANS OF APPLYING A FLUX

Norris O. Taylor, Media, Pa.

No Drawing. Application July 12, 1949,
Serial No. 104,381

3 Claims. (Cl. 148—23)

My invention relates to a means for applying a soldering flux upon a surface which is to be soldered. More particularly, it is concerned with a method and means of applying flux wherein the flux will remain on the surface and within the limits to which it has been applied. A particular feature of the flux is that it will fuse with the oxides on the metal surface at a temperature which is just below the soldering temperature. While these features of a soldering flux may have wide utility, they are particularly important in soldering precious metal surfaces such as jewelry and dental pieces.

One of the handicaps in prior methods of soldering has been in keeping the fluxing agent within the predetermined limits of the area of the metal surface on which the soldering operation is to be performed. Fluxing agents are frequently sold as a powder, paste, liquid or solid. It is often difficult to apply a flux in any one of these forms to the exact area on which the soldering operation is to be performed, but even when this has been accomplished, the application of sufficient heat for soldering causes the fluxing agent to melt or flow, or to effervesce onto the surrounding areas.

Another handicap of prior fluxes has been that when the heat is applied thereto, a portion of the flux evaporates before the soldering temperature is attained. Thus, in soldering metals where a relatively high temperature is required, as is true of gold and its alloys, a considerable amount of the flux may have evaporated before the oxides can be fused.

I have discovered a novel means of applying a flux to a desired surface by incorporating it into a pencil structure so the flux may be applied by merely making a mark or drawing a line as in the case of an ordinary pencil or crayon. A particular feature of the flux itself is that it has a fusion temperature which is just below that of the metals which are to be joined. Moreover, the flux is incorporated in a carrier which has the capacity of evaporating a substantial portion of its mass before the soldering temperature is reached, but nevertheless, is capable of maintaining the flux within the exact area to which it has been applied. The reason being that the carrier contains a substance whose fusing temperature is relatively high. The particular flux with which I am presently concerned is for use with precious metals such as gold, but it is possible that the principles involved may be applicable for use with fluxing agents that are applied to the base metals.

In soldering precious metals, boron compounds have been found to be particularly useful. However, borax (sodium borate) and boric acid while often used as fluxes, are objectionable because of the high percentage of moisture present as water of crystallization. I have found that a more satisfactory flux can be made in which boric anhydride is the active part of the flux. Moreover, I have found that a further feature of precious metal fluxes is that the fusing temperature should be controlled so that the flux fuses with the oxides at a temperature which is just slightly below the soldering temperature. In numerous precious metal alloys used, either for jewelry or dental work, the soldering temperature will be in the neighborhood of 1400 to 1600° F. Using this temperature as a basis, I incorporate an additive with the boric anhydride so as to control its fusing temperature and maintain the same in the neighborhood of 1350 to 1400° F. This may be done in any one of a number of ways, but I have found that the formation of potassium borate in the mixture forms a satisfactory means of raising the fusing temperature. Thus, in the present invention, I have succeeded in avoiding effervescence, which occurs when a hydrated material is used such as borax or boric acid, and at the same time, I have succeeded in raising the fusing temperature so that the flux will not evaporate but will in fact fuse with the metal oxides at a temperature just below the soldering temperature.

To properly apply the flux within restricted limits on the surface to be soldered and to make its application relatively simple and easy, I have incorporated it with a waxy material which is of such a character that it may be incorporated in a pencil-like pressure resistant body, such as a crayon, or a pencil. The waxy material which forms the pencil core has a particular characteristic of retaining the flux within the limits of the mark so that it will not flow when heated and will maintain a residual portion even when the major part of the wax has been burned or evaporated away by the application of soldering heat. I have found that when a zinc compound is incorporated with a wax-like material of such a character that will leave a mark when applied to a metal surface, the zinc compound will remain on the metal surface after the waxy substance has ben burned or evaporated. The zinc compound in turn is evaporated at a temperature just slightly below the fusing temperature of the flux, but nonetheless, it retains the flux within the desired limits of the mark until its fusing temperature is reached. Thus, when heat is applied, the waxy substance is the first to burn or evaporate, after which the zinc compound burns or evaporates and thereafter the flux fuses with the metal oxide at a temperature just below the soldering temperature so that the flux is maintained within the desired limits until fusion occurs.

An object of the invention is to provide a means of soldering wherein a flux may be applied by making a marking on the area where soldering is to occur and wherein the flux will be retained within the limits of the mark when soldering heat is applied.

Another object is to incorporate a soldering flux in a waxy carrier forming the core of a pencil for the application thereof by the making of a mark on a desired surface and wherein the flux will remain within the limits of the mark when heat is applied thereto.

Another object is to provide a fluxing agent containing an additive to raise the fusing temperature of the flux to a point just below the soldering temperature.

Another object is to provide a waxy carrier for a flux which incorporates a material that will retain the flux within predetermined limits after the waxy material has been evaporated by heat.

A further object is to provide an appliance for a precious metal soldering flux which incorporates boric anhydride and potassium borate in a fused mixture which is incorporated in a carrier formed of Japan wax and a zinc soap to form the core of a marking pencil so that the flux may be applied by the simple application of a pencil mark and will retain the fluxing agent within the limits of the mark until the soldering temperature is attained.

Other and further objects may become apparent from the following description and claims.

This application is a continuation-in-part of my previous application Ser. No. 20,238, filed April 10, 1948, now abandoned.

In making the flux, either borax glass and boric acid, or borax and boric acid, are combined with a potassium compound and a small amount of a fluoride and heated until fused. The potassium compound should be one which will readily produce potassium oxide which in turn combines with the boron compounds to produce potassium borate, is added to raise the fusion temperature of the boron compound and depending upon the fusion temperature of the precious metal alloy, the amount may be varied between 2 per cent and 15 per cent. The fluoride, preferably sodium fluoride, is added to give fluidity to the other materials. Typical examples for the preparation of the flux are given below.

*Example 1*

|  | Per cent |
|---|---|
| Borax glass | 44.5 |
| Boric acid | 44.5 |
| Potassium carbonate | 7.0 |
| Sodium fluoride | 4.0 |

*Example 2*

|  | Per cent |
|---|---|
| Borax | 60.0 |
| Boric acid | 32.0 |
| Potassium carbonate | 5.0 |
| Sodium fluoride | 3.0 |

The ingredients of either formula are mixed together, placed in a clay crucible, heated until thoroughly liquid and then poured onto a heat resistant surface. The glass-like appearing product thus obtained is crushed and ground to a fine powder. The powder is sifted and must be of 200 mesh or finer.

To form the carrier substance for the flux, I use Japan wax, which has incorporated therein about 20 per cent zinc stearate. The zinc may be incorporated with the wax by adding zinc stearate or by saponifying a portion of the wax with zinc hydroxide, or by incorporating zinc oxide, however, because the zinc oxide tends to separate from the wax, I prefer that it be incorporated as a zinc soap.

The ground sifted flux is incorporated with the wax prepared as described above, and it is desirable to incorporate as much flux as the wax will carry. I have found that the wax will suitably support about 30 per cent of the flux, although amounts ranging from 20 per cent to 40 per cent are satisfactory, provided the powder does not grain out of the wax.

To the mixture of wax and flux, an oil soluble dye such as Sudan Red is added to give visible color to the wax. Any other oil soluble dye of the variety of reds, blues, yellows and greens could be used, so as to give a visible color to the wax. The mixture of wax and flux is then formed by molding into a rod so as to form a crayon, or a cylindrical rod which forms the core of a marking pencil.

In a preferred form, the pencil is formed with a sheath made up of flexible paper pulp material wound around the core in a plurality of helically wound narrow strips which are joined to each other on the outer surface. This arrangement enables the wax to be exposed by removing a single paper strip.

To perform a soldering operation, a mark is placed on the surface of the metal to be soldered with the crayon or pencil formed as described above. If the metal is relatively cold, it should be heated enough to facilitate marking, but not ordinarily in excess of 90° F., at this temperature the flux-containing wax will leave a visible mark on the metal surface. Heat is then applied to initiate the soldering operation. As the temperature passes through the range of 500–600° F., the wax will flash or burn or evaporate, but the zinc compound containing the flux will remain. Since the boron compound is present as an anhydride, it will not effervesce. As the temperature is further increased, the zinc compound is burned or evaporated, leaving the residual portion of flux on the metal surface and within the original limits of the mark made by the pencil or crayon. The flux, depending upon the quantity of potassium compound, present as potassium borate, will fuse with the copper oxide or other metal oxides present on the metal surface at a temperature in the range of 1300 to 1400° F., leaving the metal surface thoroughly cleansed to receive the solder at a temperature in a range of 1400 to 1600° F.

The important feature of the present invention is that the several elements making up the flux appliance have different reaction temperatures so that a residual portion remains and this residual portion has the characteristic of clinging to the surface upon which it has been applied so that it does not flow or effervesce to surrounding areas.

The principal advantage in the invention resides in a simple and effective means of applying a soldering flux where it is desired to perform an accurate soldering operation, and wherein it is desirable that the flux shall not flow to surrounding areas to destroy or impair the appearance of the metal adjacent the area where the soldering operation has been performed.

My invention is defined in the terms of the appended claims.

I claim:

1. A soldering stick consisting of a pencil-like body forming a carrier composed of a mixture of a major portion of a high melting point wax and a minor portion of a zinc soap, a fused mixture of finely ground soldering flux whose fusion temperature is higher than that of the components of the carrier dispersed in the carrier to the extent of substantially twenty percent to substantially forty percent of the carrier, and a cylindrical casing partially surrounding the carrier to form a marking stick, said appliance when moved in contact with a metal surface to be soldered leaving a visible mark of the combined carrier thereon which when heated beyond the flash point of the wax and the soap leaving a thin uniform layer of flux within the limits of the mark.

2. A soldering stick consisting of a pencil-like body forming a carrier composed of a major portion of Japan wax and a minor portion of zinc stearate, and a fused mixture of finely ground soldering flux whose fusion temperature is higher than that of Japan wax and zinc stearate dispersed in the carrier to the extent of substantially twenty percent to substantially forty percent of the carrier, and a cylindrical casing partially surrounding the carrier to form a marking stick, said appliance when moved in contact with a metal surface to be soldered leaving a visible mark of the combined carrier thereon which when heated beyond the flash point of the wax and zinc stearate leaves a thin uniform layer of flux within the limits of the mark.

3. A fluxing compound, consisting of a carrier composed of a high melting point fatty substance and a minor portion of zinc soap, and a pre-fused mixture of finely ground soldering flux whose fusion temperature is higher than that of either component of the carrier, said flux being intimately dispersed in the carrier to the extent of substantially twenty percent up to as much flux as the carrier will support.

NORRIS O. TAYLOR.

References Cited in the file of this patent

UNITED STATES PATENTS

| Number | Name | Date |
|---|---|---|
| 354,843 | Smith | Dec. 24, 1886 |
| 812,494 | Hussey | Feb. 13, 1906 |
| 923,934 | Benson | June 8, 1909 |
| 1,078,791 | Maes | Nov. 18, 1913 |
| 1,188,188 | Litot | June 20, 1916 |
| 1,263,656 | Fahrenwald | Apr. 23, 1918 |
| 1,472,781 | Baewskin | Nov. 6, 1923 |
| 1,702,234 | Goodridge | Feb. 12, 1929 |
| 1,882,567 | Saukaitis | Oct. 11, 1932 |
| 1,940,262 | Lytle | Dec. 19, 1933 |
| 2,161,556 | Carroll | June 6, 1939 |
| 2,196,853 | Cinamon | Apr. 9, 1940 |
| 2,499,641 | Goody | Mar. 7, 1950 |

FOREIGN PATENTS

| Number | Country | Date |
|---|---|---|
| 10,108 1912 | Great Britain | Apr. 17, 1913 |
| 378,802 | Great Britain | Aug. 18, 1932 |